(12) United States Patent
Goudy

(10) Patent No.: US 9,084,392 B2
(45) Date of Patent: Jul. 21, 2015

(54) MOWER INCLUDING SUPPORTING MEMBER FOR CUTTING AROUND OR NEAR OBSTACLES

(71) Applicant: Harlan Clifford Goudy, Tucson, AZ (US)

(72) Inventor: Harlan Clifford Goudy, Tucson, AZ (US)

( * ) Notice: Subject to any disclaimer, the term of this patent is extended or adjusted under 35 U.S.C. 154(b) by 0 days.

(21) Appl. No.: 14/217,651

(22) Filed: Mar. 18, 2014

(65) Prior Publication Data

US 2014/0260154 A1    Sep. 18, 2014

Related U.S. Application Data

(62) Division of application No. 13/843,862, filed on Mar. 15, 2013, now Pat. No. 8,713,904.

(51) Int. Cl.
*A01D 34/00* (2006.01)
*A01D 34/84* (2006.01)

(52) U.S. Cl.
CPC ..................................... *A01D 34/84* (2013.01)

(58) Field of Classification Search
USPC ........ 56/15.5, 235, 330, 15.2, 14.9, 12.7, 7, 6
See application file for complete search history.

(56) References Cited

U.S. PATENT DOCUMENTS

| | | | |
|---|---|---|---|
| 2,838,901 A | 6/1958 | Davis | |
| 3,183,651 A | 5/1963 | Hoefler | |
| 3,274,762 A * | 9/1966 | Timmons | 56/15.2 |
| 3,526,083 A | 9/1970 | Barry et al. | |
| 3,665,685 A | 5/1972 | Allard | |
| 3,715,872 A | 2/1973 | Thompson, Jr. | |
| 3,750,376 A | 8/1973 | Cioni | |
| 3,797,209 A | 3/1974 | Davis | |
| 4,104,851 A | 8/1978 | Perry | |
| 4,697,405 A | 10/1987 | DeWitt et al. | |
| 4,802,327 A | 2/1989 | Roberts | |
| 4,901,508 A | 2/1990 | Whatley | |
| 4,953,625 A * | 9/1990 | Hurworth | 172/305 |
| 5,050,372 A | 9/1991 | Heiskell | |
| 5,396,754 A | 3/1995 | Fraley | |
| 5,471,824 A | 12/1995 | Neely | |
| 5,704,201 A | 1/1998 | Van Vleet | |
| 6,182,428 B1 | 2/2001 | Hatfield | |
| 6,591,592 B1 | 7/2003 | Krimminger | |
| 6,684,614 B2 | 2/2004 | Greenwell | |
| 6,804,941 B2 | 10/2004 | Washburn | |
| 6,837,033 B2 * | 1/2005 | Schlesser et al. | 56/14.9 |
| 6,840,026 B2 | 1/2005 | Pellenc et al. | |
| 6,860,093 B2 | 3/2005 | Scordilis | |
| 6,892,518 B1 | 5/2005 | Bares | |

(Continued)

FOREIGN PATENT DOCUMENTS

| | | | | |
|---|---|---|---|---|
| CH | 557631 A | | 11/1974 | |
| CH | 557631 A | * | 1/1975 | A01D 34/86 |

(Continued)

*Primary Examiner* — Árpád Fábián-Kovács
(74) *Attorney, Agent, or Firm* — Griffiths & Seaton PLLC

(57) ABSTRACT

A mower cuts vegetation and brush growing around and near obstacles. A supporting member pivotally connects to a supporting vehicle. The supporting member includes a pivotal connect that connects to a mower arm. The mower arm provides a pivotal connect at one end for a pivotal arm to connect thereto. The pivotal arm pivoting about an axis of rotation defined by the pivotal connect. Two rotary cutters connect to both ends of the pivotal arm and rotate about an axis of rotation defined by their respective pivotal connects.

4 Claims, 7 Drawing Sheets

(56) References Cited

U.S. PATENT DOCUMENTS

| | | |
|---|---|---|
| 6,959,528 B1 | 11/2005 | Scordilis |
| 7,024,844 B2 | 4/2006 | Schlesser et al. |
| 7,093,414 B2 | 8/2006 | Washburn |
| 7,363,754 B2 | 4/2008 | Cartner |
| 7,398,637 B1 * | 7/2008 | Sevey ............................ 56/14.9 |
| 7,523,601 B2 | 4/2009 | Wolff |
| 7,784,255 B2 | 8/2010 | Moore, Jr. et al. |
| 7,966,794 B2 | 6/2011 | Thompson et al. |
| 8,099,938 B2 | 1/2012 | Kure et al. |
| 2005/0193700 A1 | 9/2005 | Bares |
| 2006/0288679 A1 * | 12/2006 | Wright ............................ 56/10.4 |
| 2008/0078154 A1 | 4/2008 | Wright |
| 2009/0249758 A1 | 10/2009 | Weeden |
| 2013/0042590 A1 | 2/2013 | Hafner |

FOREIGN PATENT DOCUMENTS

| | | | |
|---|---|---|---|
| WO | 03007691 A1 | 1/2003 | |
| WO | WO 03007691 A1 * | 1/2003 | ............. A01D 34/86 |

\* cited by examiner

MOWER INCLUDING SUPPORTING MEMBER FOR CUTTING AROUND OR NEAR OBSTACLES

CROSS REFERENCE TO RELATED APPLICATIONS

This application is a Division of U.S. patent application Ser. No. 13/843,862, filed on Mar. 15, 2013.

FIELD OF THE INVENTION

The present invention relates generally to agricultural implements and, more particularly, to a mower for cutting vegetation and brush around or near obstacles, such as fences, guardrails, trees, and posts.

DESCRIPTION OF THE RELATED ART

Agricultural implements, such as mowers, are used to cut vegetation and brush along highway areas and ditches. Typically, the mower includes a tractor and a rotary mower or cutter. The rotary mower is operationally connected to the tractor via power driven mechanism, such as a power take-off (PTO). The rotary mower is usually connected to the back of the tractor and is pulled behind the tractor. As the tractor moves forward, the rotary mower mows vegetation and brush.

SUMMARY OF THE INVENTION

In exemplary embodiments, an apparatus and method for cutting vegetation around and near obstacles are provided. In one embodiment, by way of example only, an apparatus includes a supporting member adapted for pivotally connecting to a supporting vehicle, a mower arm comprising a proximal end portion and a distal end portion, the proximal end portion pivotally connected to a first portion of the supporting member, a pivotal arm comprising a first end portion and a second end portion, the pivotal arm pivotally connected to the distal end portion of the mower arm, a first rotary cutter, the first rotary cutter rotatably connected to the first end portion of the pivotal arm, and a second rotary cutter, the second rotary cutter rotatably connected to the second end portion of the pivotal arm.

In one embodiment, by way of example only, a method for mowing around an obstacle while traveling in a straight line is provided. The method includes holding a mower arm in a first position, the first position being forward of a perpendicular extending horizontally of a direction of travel, the direction of travel being defined by a supporting vehicle moving in a forward direction during a mowing operation, holding a pivotal arm in a second position such that a first rotary cutter is in a leading position relative to a second rotary cutter in the direction of travel, and rotating the first and second rotary cutters to cut a swath in the direction of travel, releasing the pivotal arm when the first cutter rotary cutter makes contact with an obstacle, the pivotal arm being free to pivot about a vertical axis, releasing the mower arm when the mower arm makes contact with the obstacle, the mower arm being free to pivot about a vertical axis, pivoting the pivotal arm about a vertical axis such that the first rotary cutter moves from a leading position to a trailing position with respect to the second rotary cutter, as the mower arm moves from a relatively forward position to a relatively rearward position with respect to the direction of travel, and moving the mower arm from a relatively rearward position to a relatively forward position with respect to the direction of travel, as the pivotal arm moves into a relatively parallel position with the direction of travel, the second rotary cutter leading the first rotary cutter.

In one embodiment, an apparatus includes a positioning device for positioning a mower arm in at least a first position, the positioning device including a guide member located on the mower arm and a first actuator located on the supporting member and facing the guide member, the first actuator being operable to engage the guide member to hold the mower arm in the at least first position and to disengage the guide member to release the mower arm from the at least first position.

In one embodiment, an apparatus includes a return device for returning a mower arm to the at least first position, the return device being connected between the mower arm and the supporting member.

In one embodiment, an apparatus includes a release mechanism for holding and releasing a pivotal arm, the release mechanism including a holding plate located on the pivotal arm and a tension device located on the mower arm and facing the holding plate, the tension device releasable connecting to the holding plate.

In addition to the foregoing exemplary apparatus embodiment, other exemplary apparatus and method embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
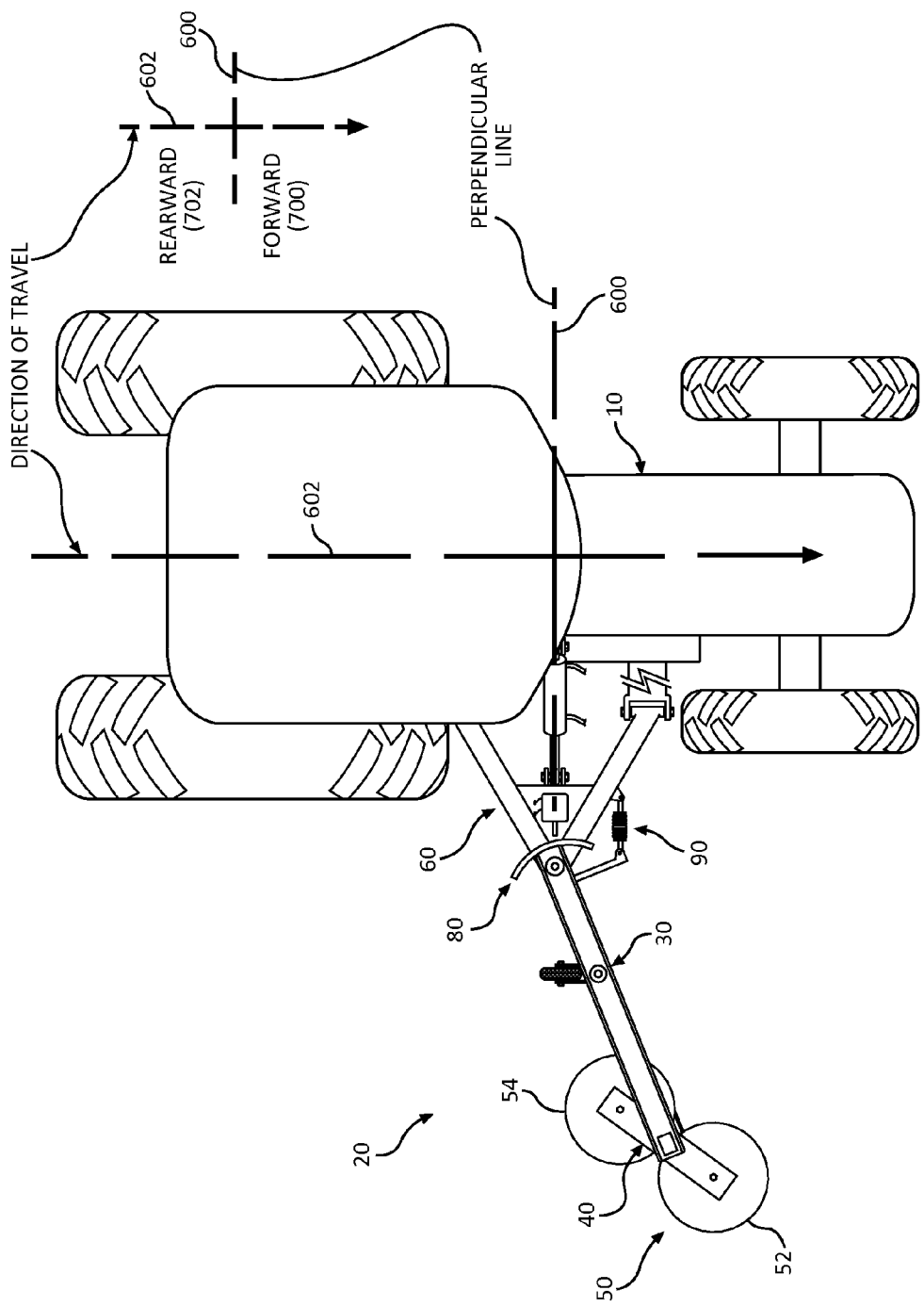
FIG. 1 is a top plane view illustrating an embodiment of a mowing apparatus in which aspects of the present invention may be realized.

Vegetation and brush growing along roads, highways, and ditches can present unsafe driving conditions for motorizes utilities these roadways. To help protect the public and maintain safe driving conditions, governmental agencies will have workers mowing the vegetation along the highways and ditches. The highway crew maybe operating a tractor connected to a mower where the mower cuts a swath behind the tractor. When the mower encounters an obstacle, such as guardrails, signs, and fence posts, the operator must steer the mower away from the obstacle to avoid damaging the obstacle and/or mower. This leaves uncut areas of vegetation and brush around and near the obstacle. To mow these uncut areas, additional resources, such as, manpower, equipment, and time are needed, resulting in an increase in manpower, increase in the time it takes in the mowing operation, increase in fuel consumption, and an increase in operational expenses. Additionally, the working crew having to trim the uncut areas maybe working from the shoulder of the road, putting themselves and motorist in an unsafe situation.

Moreover, fences, safety cables, and guardrails present various challenges in cutting vegetation underneath these structures. For example, in addition to having obstacles, such as post, the clearance between the ground and guardrail is often low. Designing a mower capable of efficiently cutting vegetation around posts and along fence row is challenging, yet, no mower currently provides a solution that satisfactory in performance, adaptability, control, and safety.

Therefore, the mechanisms of the illustrated embodiments seek to address these factors, as listed above, by providing a mowing apparatus and method to cut vegetation and brush around and/or near obstacles without the need to alter the forward direction of the mowing operation.

In the exemplary embodiments, a mowing apparatus and method provide a more efficient operation in mowing around and near obstacles. By way of example, in one embodiment, the mowing apparatus includes a supporting member adaptable to supportively connect to any portion of a tractor or supporting vehicle, including the lateral side of the tractor, permitting the tractor to pull another agriculture implement, such as another rotary cutter behind it. The mowing apparatus provides the ability to combine two separate mowing operations (e.g., the mowing of a ditch and the mowing of a fence line) into one mowing operation, resulting in reducing operation expense, fuel consumption, manpower, and time needed in the mowing operation. Additionally, by combining two mowing operations into one, cost savings are realized by avoiding the need to deploy additional equipment and crews.

The mowing apparatus ability to operationally connect to either lateral side of the tractor or supporting vehicle improves the working conditions of the mowing operation by allowing the tractor to operate in the ditch as the mowing apparatus mows around or near obstacles next to the roadway. Additionally, the mowing apparatus provides the ability to achieve a safer working environment by allowing the tractor or supporting vehicle to operate in the ditch as the mowing apparatus mows near the road. Therefore, in various embodiments, a mowing apparatus and method to cut vegetation and brush around and near obstacles is provided.

In the exemplary embodiments, the mowing apparatus and method allows the cutting heads to operate under fences, safety cables, and guardrails while cutting a swath along the fence row. For example, in one embodiment, the mowing apparatus includes a mower arm pivotally connected at one end to a supporting member and at the opposite end of the mower arm, a pivotal arm pivotally connected thereto, the pivotal arm including two rotary cutters. The mowing apparatus ability to position one rotary cutter behind an obstacle and pivot both rotary cutters during the mowing operation permits the mowing operation to cut the vegetation around the obstacle, increasing the performance and efficiency of mowing operation, a reduction in uncut areas, and the need to use additional resources to cut on both sides of the fence row.

By way of another example, in one embodiment, the mowing apparatus includes a hitch attachment adapted to pivotally connect to a supporting vehicle or tractor, a mower arm pivotally connected to the attachment, a pivotal arm pivotally connected to the mower arm, and a cutting head rotatable connected to the pivotal arm. Considering the difficulty in cutting vegetation around obstacles, the illustrated embodiments may include at least two cutting heads arranged in relation to one another to cut vegetation in the direction of travel of the mowing operation. In one embodiment, the cutting head includes at least two rotary cutters, the rotary cutters pivotally connected to the pivotal arm. In one embodiment, the rotary cutters maybe offset to cut vegetation between each cutting swath so there is no uncut vegetation between the cutters.

Turning to FIG. 1, an exemplarily embodiment of a mowing apparatus 20 for cutting vegetation and/or brush around and near obstacles is shown. A supporting vehicle or tractor, generally designated as 10, is moving forward in the direction of travel 602. Mower 20 includes a supporting member or hitch attachment, generally designated as 60. The supporting member 60 is pivotally connected to the side of tractor 10 and extends outwardly in a relatively horizontal direction.

The supporting member 60 is compatible with any type of tractor or vehicle attachment, including, but not limited to, hitches, clevis-to-tongue connections, three-point hitches, drawbars, quick release connections, PTO(s), hydraulics, connectors and/or mounts. For example, the tractor attachment maybe configured as a clevis-to-tongue connection. In this clevis-to-tongue configuration, supporting member 60 may take the form of a hitch attachment having a tongue portion that pivotally connects to the clevis portion of the tractor attachment. Accordingly, supporting member 60 is adaptable to supportively connect mower 20 to any type of tractor or vehicle attachment.

Mower 20 includes a mower arm 30 pivotally connected to the supporting member 60. The mower arm 30 pivots about a relatively vertical axis and moves or swings from a forward position 700 to a rearward position 702 and from a rearward position 702 to a forward position 700. One end of the mower arm 30 moving along a relatively curved line or arc as the mower arm 30 pivots. The mower arm 30 defining the radius of the curved line. A pivotal arm 40 is pivotally connected to the mower arm 30 and pivots about a generally vertical axis. The pivotal arm 40 being located on the portion of the mower arm 30 that moves in an arc motion. A cutting head 50 is rotatable connected to the pivotal arm. As illustrated in the exemplary embodiment, the cutting head 50 includes rotary cutters 52, 54. Each rotary cutter being operatively driven to rotate about an axis of rotation.

A position device 80 is releasable connected to the mower arm 30 and holds the mower arm 30 in a forward position relative perpendicular line 600. The positioning device 80 releases the mower arm 30 from a holding position in the forward position when the mower arm makes contact with an obstacle, such as a post. Once the positioning device 80 releases the mower arm 30, the mower arm 30 is free to pivot about a vertical axis. A return device 90 returns the mower arm 30 to a forward position where the positioning device 80 holds the mower arm 30 in the forward position. For example, as the mower arm moves from a forward position to a rearward position, the return device asserts an appropriate tension force on the mower arm to return the mower arm to a forward position.

Figure 2:
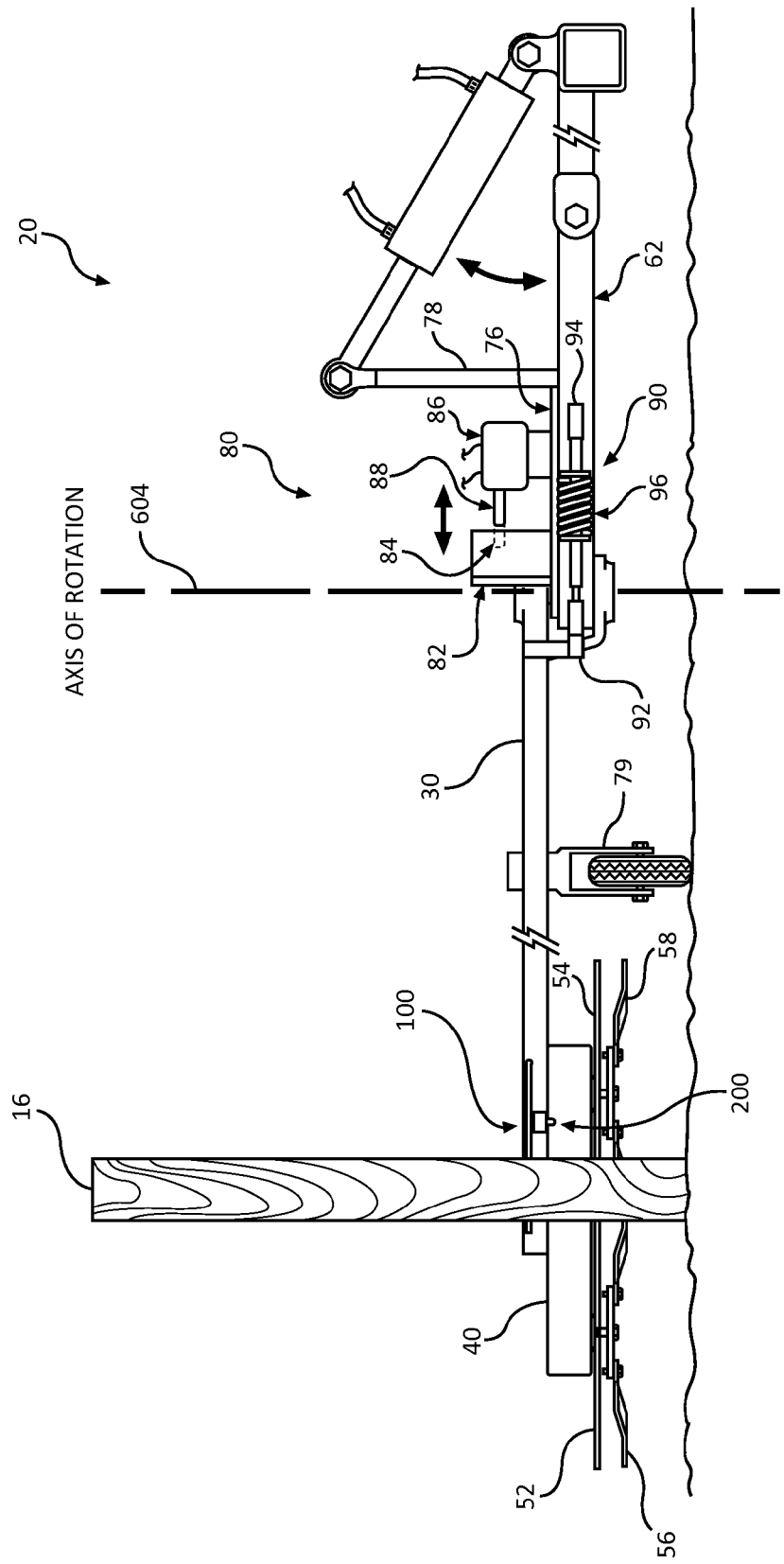
FIG. 2 is a front elevational view illustrating an embodiment of a mowing apparatus in which aspects of the present invention may be realized.

As illustrated in FIGS. 1-2, the hitch attachment 60 pivotally connects to the three-point hitch of tractor 10. Hitch attachment 60 includes support leg 62, support leg 68, deck 76, and connecting member 78. Support legs 62, 68 pivotally connect to the mounting brackets of tractor 10. Connecting member 78 is located on or near deck 76 and is configured to operationally connect to a power actuator 18 of tractor 10. For example, connecting member 78 connects to the hydraulic ram 18 of tractor 10. When the tractor's hydraulic ram 18 is moved in an upwardly direction relative to a vertical axis, the mower 20 also moves in an upwardly direction. Similarly, when the tractor's hydraulic ram 18 is moved in a downwardly direction relative to a vertical axis, mower 20 is moves in a downwardly direction. Hence, mower 20 may be raised or lowered relative to the ground via the hydraulic ram 18.

Additionally, mower 20 may be placed in a float position via hydraulic ram 18. In the float position, the cutting head 50 floats or follows the contours of the ground, allowing the cutting blades to mow the vegetation at an appropriate cutting height. In one embodiment, mower 20 includes a wheel 79 connected to mower arm 30. The wheel 79 may be located on the mower arm 30. The wheel 79 may be an adjustable wheel. The height of the mower arm 30 in relation to the ground may be adjusted by the wheel 79. For example, wheel 79 adjustably fastens to the mower arm 30 to adjust the height of the mower arm 30 in relation to the ground.

Mower 20 is adaptable to work in any mowing environment, including mowing under guardrails and fences while mowing around guardrail post and fence post, for example. Moreover, mower 20 is adaptable to mow at any elevation of grade. For example, the tractor 10 maybe performing a mowing operation along a highway, such as in the ditch, where the tractor is pulling an implement, such as a cutter. Mower 20 operationally connects to a side of the tractor 10 to cut vegetation that has grown around the post of the highway signs. As the tractor cuts the grass in the ditch, mower 20 mows the grass up by the highway. In this mowing environment, mower 20 is mowing around the highway post while the tractor mows the ditch.

Furthermore, mower 20 permits two mowing operations to take place at the same time, utilizing the same equipment 10 (e.g., a supporting vehicle or tractor). The ability of mower 20 to operate in conjunction with another mowing operation being performed by the tractor reduces the need to have a second working crew mowing along the fence line and post. For example, by combining the two operations, mowing around roadway signpost and mowing the ditch into one operation, there is no need to have a second mowing operation. The results are an increase in the efficiency of the mowing operation, a reduction in fuel consumption, a reduction in manpower and time. Additionally, there is an increase in safety as a second mowing crew does not have to mow around the highway posts next to the highway. Moreover, the placement of the tractor in the ditch and the ability of mower 20 to cut around obstacles near the roadway helps protect both motorist and the operator of the tractor from possible accidents.

Although a tractor 10 is depicted in FIG. 1, mower 20 is adaptable to operate with any agricultural equipment or support vehicle, such as, for example, a riding mower, all-terrain vehicle (ATV), utility vehicle, or other equipment capable of connecting to mower 20. Moreover, mower 20 is adaptable to operate with any power delivery system and may be hydraulically powered, mechanically powered, electrically powered and/or any combination thereof. Additionally, mower 20 may operationally connect to tractor 10 via power-take-off (PTO) connection, a hydraulic connection, an electrical connection and/or any combination thereof. Accordingly, mower 20 is adapted to operate with any type of power mechanism.

Also, mower 20 supportively connects anywhere on tractor 10. For example, mower 20 may connect to either lateral side of tractor 10, to the front of tractor 10, or to the rear of tractor 10. Thus, mower 20 is adaptable to be position anywhere on a supporting vehicle or tractor.

As illustrated in FIGS. 2-10, the mower 20 includes a supporting member 60, a mower arm 30 connected to the supporting member 60 and pivoting about axis 604, a pivotal arm 40 pivotally connected to the mower arm 30 and pivoting about axis 606, and a cutting head 50 connected rotatable to the pivotal arm 30.

The mower arm includes a proximal end and a distal end. The proximal end of the mower arm pivots about a vertical axis 604. The pivotal arm pivotally connects to the distal end of the mower arm. The pivotal arm includes a first portion and a second portion. The cutting head includes a first rotary cutter and a second rotary cutter. The first rotary cutter rotatable connects to the first portion of the pivotal arm. The second rotary cutter rotatable connects to the second portion of the pivotal arm. The supporting member 60 pivotally connects to a tractor or supporting vehicle 10. The proximal end of the mower arm pivotally connects the supporting member 60.

Figure 3:
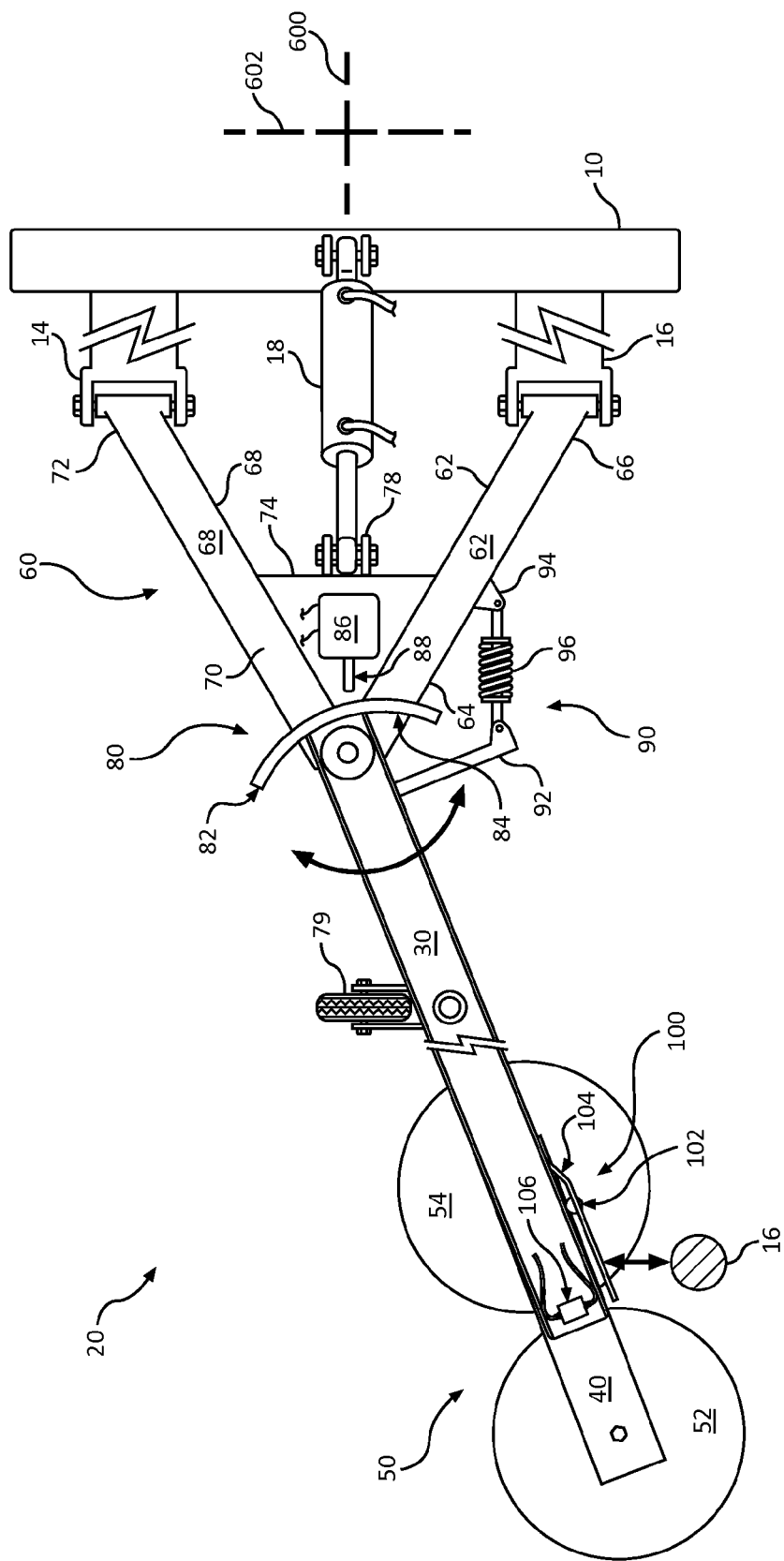
FIG. 3 is a top plan view illustrating an embodiment of the mowing apparatus as shown in FIG. 2 in which aspects of the present invention may be realized.

As shown in FIGS. 2-3, supporting member 60 includes a first member 62 and second member 68. The first member 62 includes a first portion end 64 and a second portion end 66. The second portion end 66 has a mounting bracket that pivotally connects to a first mounting bracket 16 of the tractor. The second member 68 includes a first portion end 70 and a second portion end 72. The second portion end 72 has a mounting bracket that pivotally connects to a second mounting bracket 14 of the tractor.

The first portion end 64 of the first member 62 and the first portion end 70 of the second member 68 are connected or joined together. In one embodiment, the first member and the second member are joined together to form a generally A-shape frame.

A top plate 76 is arranged at the first portions 64, 70 and extends toward the second portions 66, 72 of the first member and the second member 62, 68, respectively.

In one embodiment, the top plate 76 forms a generally triangle shape. In one embodiment, a cross beam 74 extends between the first member 62 and second member 68 and runs in a direction generally parallel to cross beam 74.

A third member 78 is positioned at next to a side of top plate 76. The third member 78 extends upwardly in a relatively vertical direction from a horizontal plane and includes a connecting portion that pivotally connects to the power actuator 18, such as a hydraulic ram, of the tractor. The third member maybe located or position approximate to the center axis of mower arm. In one embodiment, the third member is position on cross-member 74 and extends in a perpendicular direction relative to cross-member 74. In one embodiment, the third member is position on top plate 76. In one embodiment, the third member is position on the side of top plate 76.

The mower 20 is raised or lowered via the power actuator 18 of the support vehicle or tractor 10. For example, when the hydraulic ram is moved in an upwardly direction, attachment moves in an upwardly direction to raise or lift the mower. Similarly, when the hydraulic ram is moved in a downwardly direction, attachment moves in a downwardly direction to lower the mower. Thus, by actuating the hydraulic ram, the mower can be raised or lowered. Additionally, if the hydraulic ram is in a float position, the mower will follow the contours of the ground while cutting the vegetation, for example.

In one embodiment, the mower 20 includes a wheel 79 located on mower arm 30. The wheel is adjustable and may assists in regulating the cutting height of the mower. For example, when the hydraulic cylinder is place in the float position, the wheel 79 may assist the mower arm in regulating cutting blades height relative to the ground. In one embodiment, the wheel is a caster wheel.

The positioning device 80 includes a guide member 82 and an actuator 86. The guide member 82 is located at the end portion of the mower arm 30 and moves with the mower arm 30. The guide member 82 may extend in a relatively upwardly direction from end of the mower arm 30. The guide member 82 includes a first portion and a second portion. The first portion includes a guide hole 84 that is adaptable to accept an engagement member 88 of actuator 86.

In one embodiment, the guide member 82 forms a generally curved surface. In one embodiment, the outward side of the curved surface is toward the actuator 86. In one embodiment, the inward side of the curved surface is toward the actuator 86. In one embodiment, the outward side of the curved guide member 82 makes contact with the actuator 86. In one embodiment, the inward side of the curved guide member 82 makes contact with the actuator 86.

The actuator 86 is located on a portion of the supporting member 60 and faces the guide member 82. The actuator 86 includes an engagement member 88 that engages and disengages the guide hole 84. For example, the actuator 86 moves the engagement member 88 in and out the guide hole 84. The engagement member 88 may include a pin 88. The pin 88 may move in a relatively horizontally direction to engage and disengage the guide hole 84. The guide hole 84 may be a partial hole or indentation that receives the pin 88.

The actuator 86 may be mechanically or electrically operated. For example, the actuator 86 may include an electrical device that is activated to move the engagement member 88. When the actuator 86 is activated, turned on, the engagement member 88 moves rearward, away from guide member 82 and disengages guide hole 84. When the actuator 86 is turned off, the engagement member 88 moves forward, toward the guide member 82 and makes contact with the surface of guide member 82. As the mower arm pivots forward, the portion of the guide member 82 having the guide hole 84 moves forward and the engagement member 88 engages the guide hole 84 to position the mower arm 30 in position A 502. The actuator 86 maybe operated the other way too, where the actuator 86 is turned on or activated, the engagement member 88 moves forward into the guide hole 84 and when the actuator 86 is turned off, the engagement member 88 rearward out of the guide hole 84.

Figure 4:
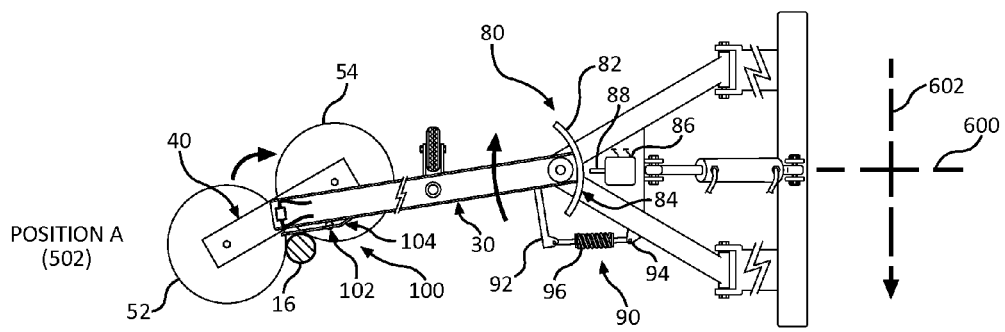
FIG. 4 is a top plan view illustrating an embodiment of the mowing apparatus as shown in FIG. 3 in which aspects of the present invention may be realized, the mowing apparatus is a working mode.

Turning to FIGS. 2 and 4, as indicated by horizontal directional arrows, the pin 88 moves in and out of the guide hole 84. When the pin 88 engages guide hole 84, the mower arm 30 is held in position A 502. When the pin 88 disengages guide hole, the mower arm 30 is free to pivot about axis 604.

The actuator 86 may include a solenoid, for example. The solenoid may include a pin and a spring. When the solenoid is activated, the solenoid pin moves inward, withdrawing the pin from the guide hole. When the solenoid is deactivated, the solenoid spring pushes the solenoid pin outward, contacting the curve surface of the guide member 84.

As shown in FIGS. 2-10, the return device 90 includes a first member 92, a second member 94, and a return spring 96. A first portion of the first member 92 connects to mower arm 30 and a second portion of the first member 92 connects to the return spring 96. A first portion of the second member 94 connects to first member 62 and a second portion of the second member connects to the return spring 96. The return spring 96 returns the mower arm 30 to a position, such as position A 502. At position A 502, the engagement member 88 engages the guide hole 84 of guide member 82. The mower arm 30 is returned to its original position or starting position for mowing around post 16, for example.

The mower 20 includes a second actuator 100. The second actuator 100 is located at a second portion of the mower arm 30. The second actuator 100 includes an electrical switch 102 and a gate 104. The second actuator 100 is operatively connected to the first actuator 86. For example, the first actuator 86 and the second actuator 100 are operatively connected together via electrical wires.

The gate 104 is position on the mower arm 30 and makes contact with the electrical switch 102. The gate 104 includes a first side and a second side. The first side or forward side makes contact with an obstacle 16, such as a post. The second side or rearward side makes contact with the electrical switch 102. The gate 104 moves in a relative direction toward and away from the switch 102. The gate 104 opens and closes switch 102. For example, when the gate 104 makes contact with the post 16, the gate 104 closes the electrical switch 102. When the gate 104 is no longer in contact with the post 16, the gate 104 moves forward, away from the electrical switch 102 and opens the electrical switch 102. Hence, the gate 104 may open or close the electrical switch 102. Similarly, the gate 104 may operate in vis-a-vis, where the gate 104 contacts switch 102 to open the switch 102 and moves away from the switch 102 to close the switch 102.

In one embodiment, the gate 104 is a flexible member that moves in a relative direction toward and away from the switch 102. In one embodiment, the flexible member is plastic. In one embodiment, the gate 104 and the electrical switch 102 are incorporated into one device, wherein the gate is part of the electrical switch.

In an exemplary embodiment, the mower arm 30 is in a forward position of a perpendicular line 600. For example, the mower arm is position at least 20 degrees of perpendicular line 600 in quadrant 700. In this forward position, guide member 82 is in contact with engagement member 88 such that the engagement member 88 is engaged in the guide hole 84. For example, the pin 88 is in the guide hole 84 and holds the mower arm 30 in a relatively forward position from perpendicular line 600. In this forward position, original or starting position, the mower arm extends toward the post 16.

At the forward position, for example, the pivotal arm 40 holds the cutting head 50 in a position wherein the first rotary cutter 52 will make contact with one side of the post 16 before the second rotary cutter 54 makes contact with the post 16. Rotary cutter 52 is in position to mow behind the post 16 or on the opposite side of the post 16, the side of the post 16 not facing the tractor 10. With the mower arm 30 in the forward or original position, rotary cutter 52 extends past the highway post 16 on one side. As rotary cutter 52 makes contact with the post, the mower arm 30 moves or pushes the rotary cutter 52 behind the post 16 allowing the cutting blades to mow on the opposite side of the post 16. The pivotal arm 40 pivots about axis 606, which allows the cutting head 50 to rotate about the highway post.

As the support vehicle or tractor 10 moves in the direction of travel 602, the gate 104 makes contact with post 16 and closes the electrical switch 102. The electrical switch 102 is operatively connected to actuator 86 and by closing switch 102, the actuator 86 moves engagement member 88 out of guide hole 84, releasing mower arm 30 form its holding position in the forward position.

By way of another example, gate 104 closes switch 102 causing the solenoid of actuator 86 to be grounded. The solenoid moves the pin toward the actuator 86, disengaging the pin 88 from the guide hole 84. The mower arm 30 is released from its forward position and is free to pivot about axis 604.

For example, the mower arm 30 swings from a forward position to a rearward position in relation to perpendicular line 600. The mower moves in a relatively forward to rearward direction, the pivotal arm is released by the release device 200 and is free to pivot about axis 606. The pivotal arm rotates the rotary cutters 52, 54 about the highway post 16. As mower arm travels past the highway post, the pivotal arm rotates the rotary cutters 52, 54 about the highway post. The gate breaks contact with the highway post and opens the electric switch. The solenoid losses electric contact and the solenoid spring pushes the pin outward toward the guide member. The pin makes contact with curved surface of the guide plate. The return device 90 moves the mower arm from the rearward position to the forward position. The mower arm continues moving in a forwardly direction via the return arm, until the pin engages hole 84. The mower arm is back-in its original or forward position. The release device 200 engages the pivotal arm, stopping the pivotal arm from pivoting about axis 606. The release device 200 holds the pivotal arm in a position where the rotary cutters 52, 54 are approximately 180 degrees from their original starting position prior to contacting the post 16. Rotary cutter 54 is now in the leading position ready to make contact with the next highway post 16. Rotary cutter 52 is in a trailing position relative to rotary cutter 54.

In one embodiment, the release device 200 engages the pivotal arm, stopping the pivotal arm from pivoting about axis 606. The release device 200 holds the pivotal arm in a position where the rotary cutters 52, 54 are approximately 360 degrees from their original starting position prior to contacting the post 16. Rotary cutter 52 is in the leading position ready to make contact with the next highway post 16. Rotary cutter 54 is in a trailing position relative to rotary cutter 52.

One benefit of having the mower arm pivotally connected at one end is the opposite end of the mower arm moves in an arc or along a relatively curved line. With the mower arm in the forward position prior to making contact with an obstacle, such as a fence post, the first rotary cutter is behind the fence post or on the opposite side of the fence post, the side of the fence post facing away from the tractor, for example. When the pivotal arm begins pivoting about a vertical axis, the mower arm moves in an arc toward a rearward direction from the forward direction of travel, which causes the pivotal arm to move the first rotary cutter rearward while moving the second rotary cutter forward. The pivotal arm continues to pivot about the vertical axis, moving the second rotary cutter around the fence post as the first rotary cutter moves from a position behind the fence post to a trailing position or following position in relation to the second rotary cutter. As the mower arm moves forward along the arc, the mower arm moves the pivotal arm in a direction toward the fence post, the pivotal arm continues to pivot about the vertical axis and the second rotary cutter continues to rotate about the fence post, mowing the front of the fence post. As the mower arm moves forward to the top of the arc, first and second rotary cutters have mowed vegetation on all sides of the fence post.

Another benefit of having the mower arm in a forward position and moving along an arc is that the mower arm moves backwards, away from the fence post, clearing the fence post as the pivotal arm pivots the rotary cutters 52, 54 around the fence post.

Figure 9:
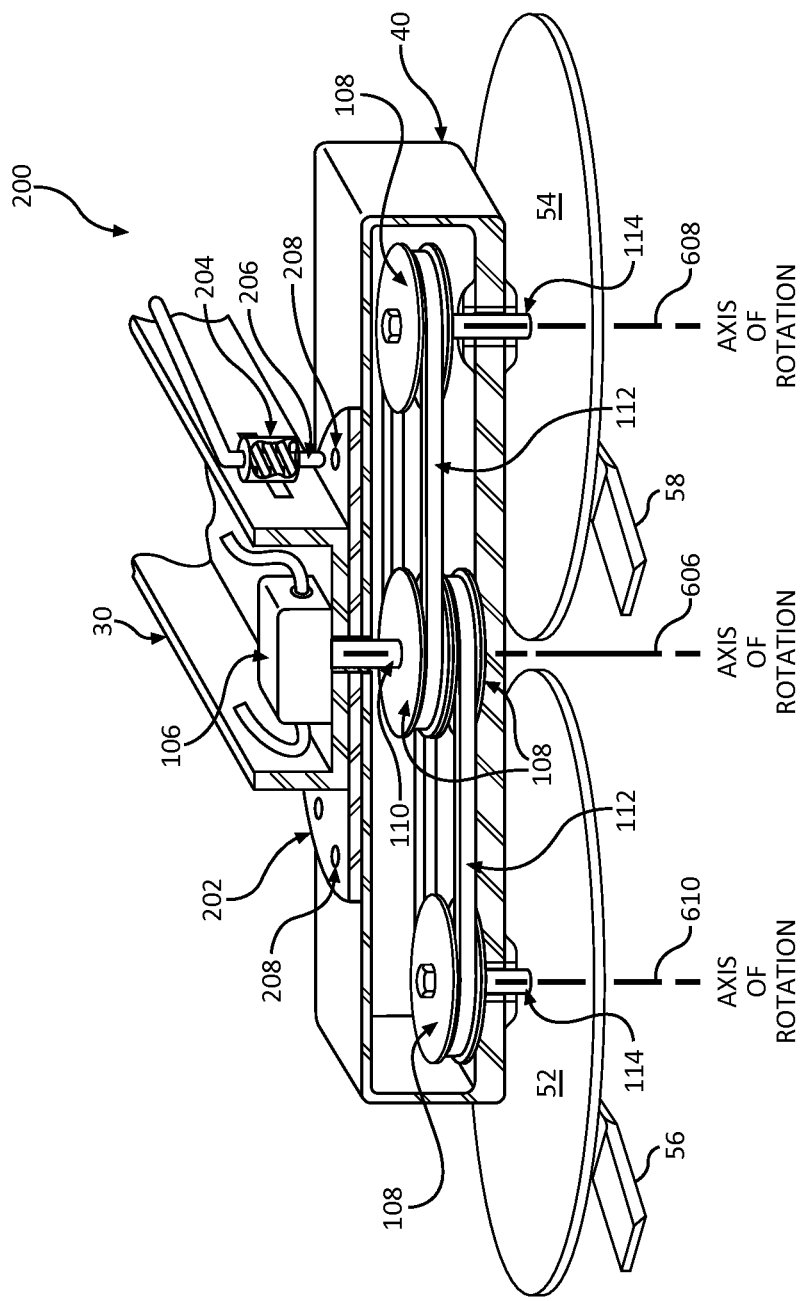
FIG. 9 is a frontal sectional view illustrating an embodiment of a pivotal arm and a release mechanism as generally shown in FIG. 2 in which aspects of the present invention may be realized, portions of the rotary cutters are removed for clarity.
Figure 10:
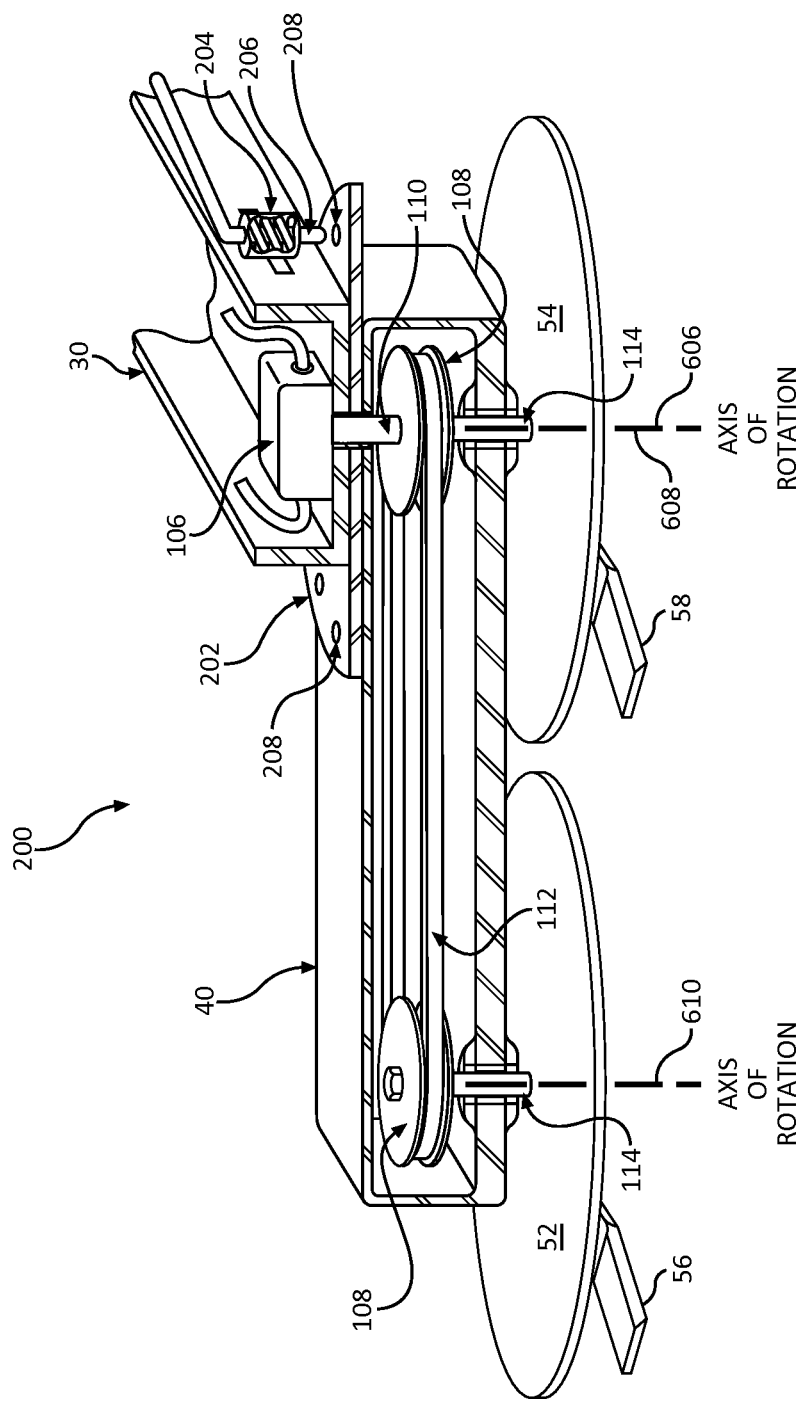
FIG. 10 is a frontal sectional view illustrating another embodiment of a pivotal arm and a release mechanism as generally shown in FIG. 2 in which aspects of the present invention may be realized, portions of the rotary cutters are removed for clarity.

As illustrated in FIGS. 2, 9, and 10, the mower includes a pivotal arm 40, rotary cutters 52, 54, a motor 106, drive mechanism 107, and a release device 200. The pivotal arm connects to mower arm and pivots about axis 606. Rotary cutters 52, 54 connect to pivotal arm and rotate about axis 608, 610, respectively. The rotary cutters 52, 54 include cutting blades 56, 58, respectively. In one embodiment, the pivotal arm 40 pivotally connected to the mower arm at approximately the center of the pivotal arm. In an alternative embodiment, the mower arm 30 is offset from the center of the pivotal arm 40. In one embodiment, the pivotal arm pivotally connects to the mower arm at the end of the pivotal arm.

The motor is located on mower arm. The rotary cutters are operationally connected to the motor via drive mechanism. When the motor is in operation, the motor provides power to the rotary cutters. The rotary cutters rotate about axis 608, 610, respectively. In one embodiment, the motor 106 and one of the rotary cutters 52 or 54 rotate about the same axis of rotation 606.

In one embodiment, the motor fits inside a portion of the mower arm and the pivotal arm houses a portion of the motor shaft and drive mechanism. A benefit of this configuration is the motor and drive mechanism are protected from debris and foreign objects that can damage the motor and drive mechanism. Additionally, this configuration provides for a low profile. A benefit of the low profile is that the rotary cutters, pivotal arm and a portion of the mower arm can perform a mowing operation under guardrails and fences.

The motor 106 may include a hydraulic motor mounted on mower arm 30. The motor 106 may include a shaft 110 that extends into pivotal arm. The shaft 110 may be supported by a bearing that allows the motor shaft 110 to rotate freely about axis 606. The shaft 110 of the motor 106 may include at least one pulley 108. The pulley 108 may be adaptable to connect to at least one belt 112. Pulley 118 may include a plurality of pulleys.

Each of the rotary cutters 52, 54 has a shaft 114 that extends into pivotal arm 40 and is supported by a bearing, respectively. The bearing allows the rotary cutters shaft to rotate freely about vertical axis 608, 610. A pulley 118 is connected to each rotary cutters shaft 114. A first belt 112 connects to the pulley 108 of rotary cutter 52 and the pulley 108 of motor 106. A second belt 112 connects to the pulley 108 of rotary cutter 54 and the pulley 108 of motor 106. When the hydraulic motor is running, the motor 106 drives the belts 112 that rotate the rotary cutters 52, 54 about axis 608, 610. The rotary cutters rotate or turn rotary blades 56, 58 to mow or cut grass.

In one embodiment, motor 106 is a hydraulic motor. In one embodiment, motor 106 is an electrical motor. In one embodiment, motor 106 is a PTO. The pivotal arm 40 may house the drive mechanism that drives the rotary cutters. For example, the drive mechanism may include belts and pulleys that are housed inside the pivotal arm to protect the drive mechanism from foreign objects, such as rocks and brush. In one embodiment, the pivotal arm forms a generally rectangular shape. In one embodiment, the pivotal arm forms a housing defining a box shape.

The release device 200 includes a plate 202 and a tension device 204. The plate is located on the pivotal arm. The tension device 204 is located on the mower arm 30. The tension device 204 includes an engagement member 206 that moves in and out of the tension device 204. The plate 202 includes a hole 208 that is adaptable to accept the engagement member 206. The tension device 204 moves the engagement member 206, which engages and disengages the plate hole 208. The engagement member 206 may include a pin.

The tension device 204 may be mechanically operated. For example, the tension device may include a pin and a spring. The spring may assert a certain force on the pin that moves the pin into the plate hole to hold the pivotal arm in position A 502. When the pivotal arm makes contact with an object 16, such as a post, the force of the contact with the post is greater than the force being asserted by the spring on the pin. The pin moves out of the hole and the pivotal arm is free to rotate about a vertical axis. The spring moves the pin into the next plate hole to hold the pivotal arm in a position where one of the rotary cutters is in a leading position and the other rotary cutter is in a trailing position.

By way of another example, the tension device 204 may be electrically operated. For example, the tension device may be an electric actuator that moves the engagement in and out the plate hole. When the actuator is switched on, the engagement member engages the plate hole to hold the pivotal arm in position A 502. When the actuator is switched off, the engagement member disengages the plate hole. The electric actuator may operate the other way where when activated, the engagement member disengages the plate hole and when de-activates, the engagement member engages the plate hole.

In one embodiment, the tension device 204 may be activated by gate 104. In one embodiment, the tension device 204 maybe incorporated as part of the actuator 100 such that when gate 104 contacts the post 16, the tension device 204 releases the pin from the indentation 208 in the plate 202, permitting the pivotal arm 40 to pivot.

In one embodiment, the plate 202 is located between the mower arm and pivotal arm. The plate includes a top surface and a bottom surface. The top surface faces the mower arm 30 and the bottom surface faces the pivotal arm 40. The top surface includes at least one indentation 208. The indentation 208 is adapted to receive the tension device 204. The tension device 204 is located on the mower arm 30. The tension device 204 includes a pin and a spring. The pin may move in and out of the tension device 204. The spring may assert a force on the pin. The pin contacts the top surface of the plate 202 and is aligned with the indentation 208. The tension device 204 releasably connects to the plate 202.

For example, the pin engages the indentation to hold the pivotal arm in a non-rotating position. When the pivotal arm makes contact with an obstacle, such as a post, the pin disengages the indentation releasing the pivotal arm. The pivotal arm is released from its non-rotating position and is free to rotate about axis 606. The spring asserts a force on the pin moving the pin into the next indentation to hold the pivotal arm. For example, the pin engages the next indentation and stops the pivotal arm from rotating about axis 606. The tension device may be adjustable to apply the appropriate tension to hold and release the pivotal arm. For example, the tension on the spring may be adjusted to assert the appropriate force on the pin for engaging and disengaging the indentations of the plate when the pivotal arm makes contact with the post.

In one embodiment, the plate includes two indentations. In one embodiment, the plate includes two indentations located approximately 180 degrees apart from each other. In one embodiment, the plate includes a plurality of indentations. In one embodiment, the plate is substantially circular in shape. In one embodiment, the plate is a circular plate. In one embodiment, the indentations are partial holes. In one embodiment, the tension device is an adjustable tension device.

In one embodiment, the pivotal arm includes the plate. In one embodiment, the pivotal arm and the plate are joined together. For example, the plate may be welded on the pivotal arm. In one embodiment, the plate extends upward from the top portion of the pivotal arm.

The pivotal arm pivotally connects to the mower arm such that the pivotal arm and plate are free to rotate about a vertical axis. For example, the pivotal arm includes a first bearing and a second bearing. The first bearing is located in the upper portion of the pivotal arm. The second bearing is located on the lower portion of the pivotal arm. The motor is mounted on the mower arm. The motor shaft extends downward into the pivotal arm. The first bearing is connected to the upper portion of the motor shaft. The second bearing is connected to the lower portion of the motor shaft. The pivotal arm is free to rotate about axis defined by the motor shaft. In one embodiment, the first bearing and second bearing are supportively connected to the motor shaft.

The motor shaft extends through the first bearing of the pivotal arm and ends at the second bearing of the pivotal arm. A fastener at the end of the motor shaft may be used to secure and hold the motor shaft in place. For example, the second bearing may be a taper bearing and the end of the motor shaft may be threaded. A bolt may be threated into the end of the shaft to secure the shaft to the second bearing.

In one embodiment, the plate extends from the upper surface of the pivotal arm. The pivotal arm and plate are supportively connected to the motor shaft via at least one bearing and are free to rotate about a vertical axis. In one embodiment, the pivotal arm and the plate each include a bearing, respectively.

In one embodiment, the plate bearing connects to a shaft extending from the mower arm to the pivotal arm. In one embodiment, a portion of the pivotal arm and the plate include a bearing. In one embodiment, the mower arm includes a bearing connected to a shaft extending downward from the mower arm to the pivotal arm. In one embodiment, the pivotal arm includes a plate that is releasably connected the mower arm to allow the pivotal arm to rotate about axis 606.

In one embodiment, the mower arm includes a first bearing and the pivotal arm includes a second bearing. A shaft connects the first bearing to the second bearing such that the pivotal arm pivots about vertical axis 606. The pivot arm may include a release device that releasable connects the pivotal arm to the mower arm. The release device releases the pivotal arm, permitting the pivotal arm to rotate about axis 606. The release mechanism engages the pivotal arm, stopping the rotation of the pivotal arm about axis 606.

In one embodiment, a first shaft connects a first bearing located on mower arm to a second bearing located on the pivotal arm, the shaft rotating about a vertical axis, the pivotal arm rotating about the shaft's vertical axis. In one embodiment, the first shaft is the shaft of a motor.

In one embodiment, the first shaft is a hollow shaft, in which the hollow shaft is adapted to receive a second shaft inside the hollow shaft. The second shaft is the shaft of a motor. For example, the hydraulic motor's shaft fits inside the hollow shaft and extends into the pivotal arm to drive the rotary cutters. By placing the motor's shaft inside the hollow shaft, the hollow shaft may provide additional protection to the motor shaft from foreign objects that may damage the motor shaft.

Referring to FIGS. 3-8, in position A 502, the mower arm 30 is in a forward position positioning the rotary cutter 52 to mow behind the post 16. Because the pivotal arm 40 is being held in a position wherein rotary cutter 52 is leading rotary cutter 54 in the direction of travel 602, the mower arm 30 is able to guide or position the rotary cutter 52 to cut swath underneath a fence line and on the opposite side of the fence post, the opposite side is the side opposite to the side of the fence post facing the tractor as the tractor moves in forward in the direction of travel 620, for example.

At position A 502, rotary cutter 52 contacts post 16, the impact with the post 16 causes the tension pin 206 to disengage the indentation hole 208 of the plate 202. The pivotal arm is free to rotate 360 degrees about vertical axis 606. For example, the pivotal arm starts rotating in clockwise direction as indicated by the arrow. At position A 502, the gate 104 contacts the post 16 causing switch 102 to close. The closing of the switch 102 activates actuator 86. Actuator 86 disengages pin 88 from guide hole 84. The mower arm 30 is released from its forward holding position and is free to pivot about axis 604. The mower arm 30 moves rearward as the tractor moves forward in the direction of travel 602.

Figure 5:
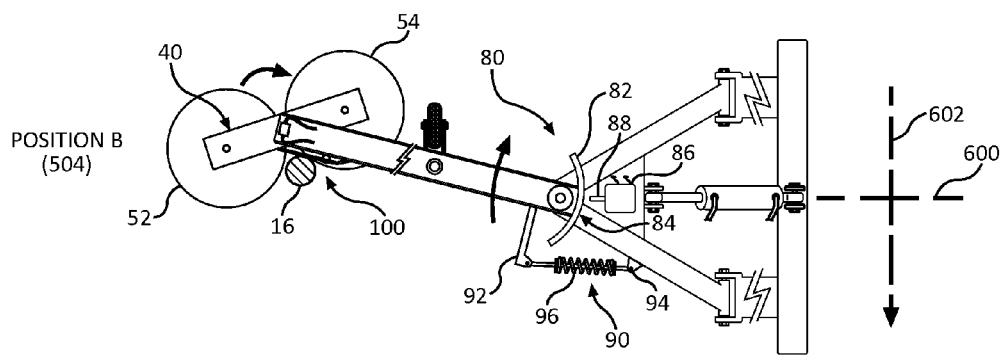
FIG. 5 is a top plan view illustrating an embodiment of the mowing apparatus as shown in FIG. 4 in which aspects of the present invention may be realized, the mowing apparatus is in a working mode.
Figure 6:
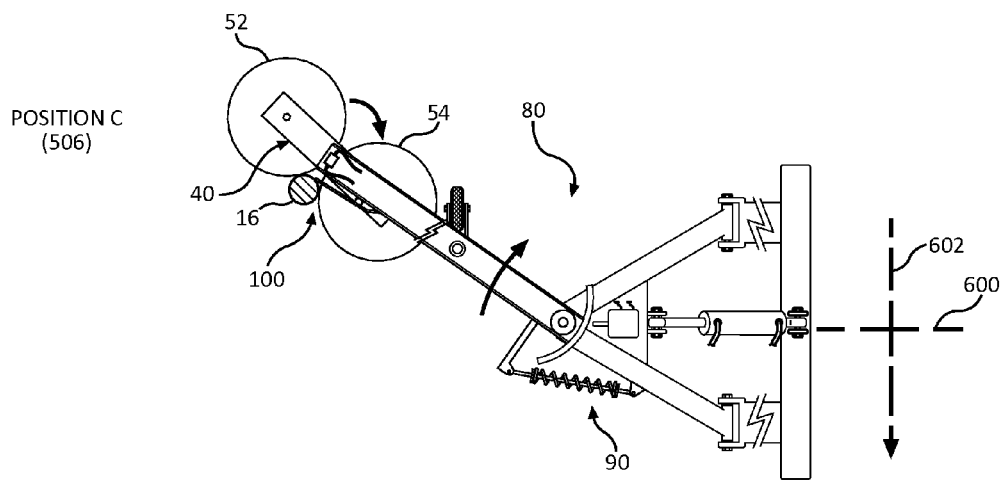
FIG. 6 is a top plan view illustrating an embodiment of the mowing apparatus as shown in FIG. 5 in which aspects of the present invention may be realized, the mowing apparatus is in a working mode.
Figure 7:
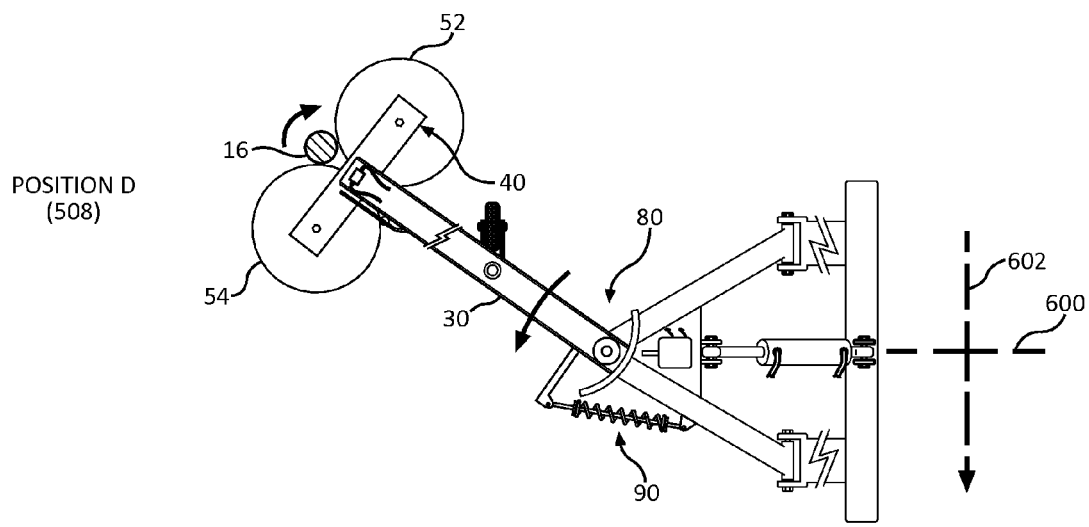
FIG. 7 is a top plan view illustrating an embodiment of the mowing apparatus as shown in FIG. 6 in which aspects of the present invention may be realized, the mowing apparatus is a working mode.

As illustrated in FIGS. 5-6, the mower arm 30 moves from its forward position in position A 502 toward a rearward position in position B 504, the movement of the end of the mower arm 30 defining an arc. The rearward motion of the mower arm 30 moves the mower arm away from the post 16.

As the mower arm 30 moves rearward, the pivotally arm 40 rotates rotary cutter 54 forward and rotates rotary cutter 52 rearward, moving rotary cutter 52 from a leading position to a trailing position, position C 508. The rearward movement of the mower arm 30 couple with the forward direction of travel 602 of the tractor 10 causes the pivotal arm to continuously pivot about the vertical axis 606, which results in rotating rotary cutters 52, 54 around post 16. For example, at position C 508, the rotary cutter 52 has completed its cut swath behind the post 16 and is moving around post 16 as rotary cutter 54 takes up a leading position to rotary cutter 52.

As the mower arm 30 moves from a rearward direction to a forward direction along an arc path, the mower arm 30 pushes the pivotal arm 40 forwards and towards post 16, causing the pivotal arm 40 to rotate rotary cutter 54 around the front side of post 16 (e.g., position D 508), resulting in rotary cutter 54 cutting a swath around the front and opposite side of post, the side of the post not facing the tractor, resulting in a cut swath around the post. For example, the combination of cutting swath of the rotary cutter 52 cutting behind and around the rearward side of the post 16 with the cutting swath of the rotary cutter 54 cutting around the front and opposite side of the post 16 provides for a complete cut swath, resulting in an efficient cut of the vegetation around the post 16.

Figure 8:
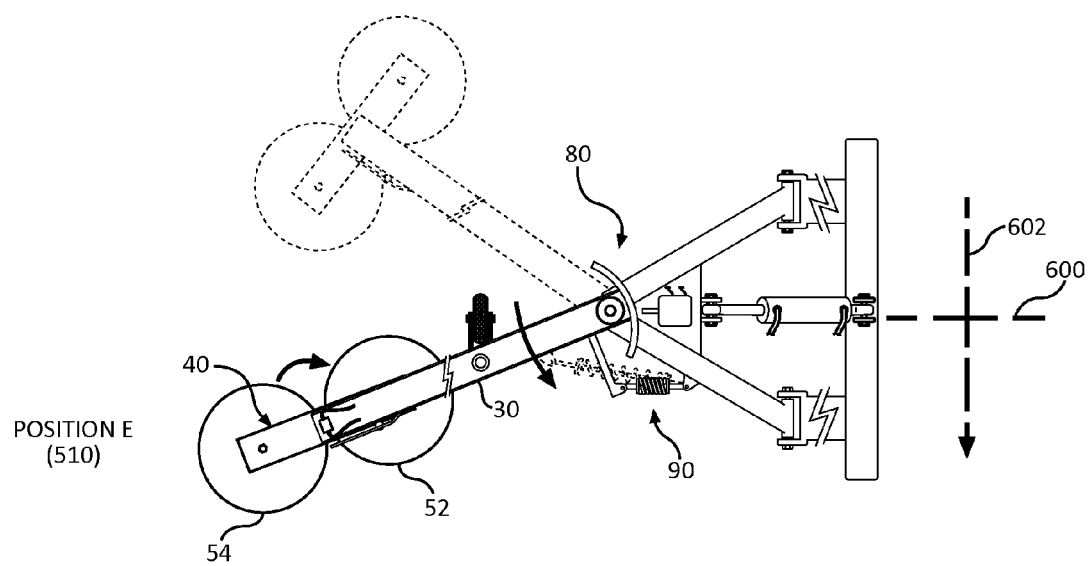
FIG. 8 is a top plan view illustrating an embodiment of the mowing apparatus as shown in FIG. 7 in which aspects of the present invention may be realized, the mowing apparatus is in a working mode.

As illustrated in FIG. 8, rotary cutter 54 has finished mowing around the front and opposite side of the post, rotary cutter 54 is now in a leading position to rotary cutter 52 (e.g., position E 510). Release device 200 engages pivotal arm 40 to hold pivotal arm in a non-pivoting position. For example, the tension device 204 engages pin 206 the next indention or partial hole 208 to stop the pivotal arm 40 from pivoting. The release device 200 holds the pivotal arm 40 in a position (e.g., position E 510). In one embodiment, the next indention 208 is located on plate 202 approximately 180 degrees from the first indention 208.

By placing the indentations or partial holes approximately 180 degrees from each other, pivotal arm is able to position one of the rotary cutters in a leading position relative to the other rotary cutter. Return device continues to apply tension force to mower arm, resulting in the mower arm moving back to its starting or original position wherein the positioning device holds the mower arm in a forward position. The mower is ready to mow around the next highway post.

In one embodiment, the plate 202 is a circular shape and includes a first indentation hole and second indentation hole positioned at about 180 degrees from each other on the circular plate. The tension pin engages the first indentation hole to hold the pivotal arm in position A. When the leading rotary cutter contacts the obstacle, the force of that contact with the object releases the tension pin from the first indentation hole. The pivotal arm rotates the rotary cutters 52, 54 from position A to position E where the second indentation hole is located approximately 180 degrees from the first indentation hole. The tension pin drops into the second indentation hole and the pivotal arm stops rotating rotary cutters 52, 54 about axis 608 and 610, respectively. The mower is in position to make contact with the next post, for example.

In one embodiment, the mower arm 30 is in a forward position relative to a perpendicular line 600 extending from the side of the tractor 10, the perpendicular line 600 being perpendicular to a centerline running from the front of the tractor 10 to the rear of the tractor, the centerline of the tractor representing the direction of travel 602 of the tractor (e.g., tractor moving forward or rearward). The perpendicular line 600 extending horizontally from the side of the tractor 10 through the centerline of the hydraulic ram of the three point hitch. The perpendicular line 600 representing 0 degrees and the direction of travel line representing 90 degrees from the perpendicular line 600, the mower arm 30 being relatively positioned in a forward position less than 90 degrees but greater than 0 degrees. In one embodiment, the mower arm is positioned in the forward 700 approximately 10-40 degrees from perpendicular line 600. In exemplary embodiments, the mower arm is positioned in the forward 700 approximately 5-15 degrees; between 15-35 degrees; between 20-30 degrees; or approximately 22 degrees from perpendicular line 600.

To further illustrate the movement of mower 20, pivotal arm 30 may rotate cutting head 50 from a range of 0 to 360 degrees about a vertical axis; from a range of 0 to 270 degrees; from a range of 0 to 80 degrees; from a range of 0 to 180; and from a range of 0 to 90. Additionally, mower arm 30 may rotate cutting head 50 from a range of from a range of 0 to 45 degrees; from a range of 0 to 35; and from a range of 0 to 15 degrees.

The foregoing embodiments seek to provide a solution for cutting vegetation and brush around and near obstacles, such as fences post and signage.

The illustrated embodiments provide for increased efficiency and productivity in a mowing operation by enabling at least two mowing operations to take place at the same time in a single operation. For example, the mowing apparatus operates to mow the fence line, guardrails, and/or post while a second mower cuts a swath behind the tractor.

While one or more embodiments of the present invention have been illustrated in detail, the skilled artisan will appreciate that modifications and adaptations to those embodiments may be made without departing from the scope of the present invention as set forth in the following claims.

What is claimed is:

1. A mower for cutting near an obstacle, the mower comprising:
   a supporting member having a first leg and a second leg, one end of the first leg and one end of the second leg joined together, the other end of the first leg and the other end of the second leg being adaptable to pivotally connect to a supporting vehicle or tractor,
   a mower arm having a distal end and a proximal end, the proximal end pivotally connected to the supporting member at approximately where the first and second legs join,
   a pivotal arm pivotally connected to the distal end of the mower arm,
   a cutter head connected rotatable to the pivotal arm, the cutter head including a first rotary cutter and a second rotary cutter; and
   a release mechanism comprising a holding plate located on the pivotal arm and a tension device located on the mower arm and facing the holding plate, the holding plate including at least one hole, the tension device comprising an engagement member that engages the at least one hole in the holding plate to hold the pivotal arm in a first position such that the first rotary cutter is in a leading position relative to the second rotary cutter and when the engagement member disengages the holding plate, the pivotal arm rotates from the first position to a second position where the engagement member engages another one of the at least one hole in the holding plate to hold the pivotal arm in the second position such that the first rotary cutter is in a trailing position relative to the second rotary cutter.

2. The mower of claim 1, wherein
the first rotary cutter is connected rotatably to a first portion of the pivotal arm, and
the second rotary cutter is connected rotatably to a second portion of the pivotal arm.

3. The mower of claim 1, further comprising:
a positioning device comprising:
   a guide member located on the proximal end of the mower arm, the guide member having convex side, the convex side including a partial hole, and
   a first actuator located on the supporting member, the first actuator having an engagement member facing the convex side of the guide member, the engagement member aligned with the partial hole to engage and disengage the partial hole, and
a return device having a first member extending from a side of the mower arm and a second member extending from a side of the supporting member, the return device including a spring connected to the first member and the second member.

4. The mower of claim 3, further comprising a second actuator located on the distal end of the mower arm, the second actuator being operatively connected to the first actuator.

* * * * *